United States Patent
Ghadialy et al.

(10) Patent No.: US 8,234,375 B2
(45) Date of Patent: Jul. 31, 2012

(54) APPARATUS AND METHOD FOR PROVIDING A MARKETING SERVICE

(75) Inventors: Majeed Ghadialy, Foster City, CA (US); Anu Shukla, Fremont, CA (US); Richard Russell Berman, San Francisco, CA (US); Mark Weiler, Burlingame, CA (US)

(73) Assignee: MYBUYS, Inc., Redwood City, CA (US)

( * ) Notice: Subject to any disclaimer, the term of this patent is extended or adjusted under 35 U.S.C. 154(b) by 429 days.

(21) Appl. No.: 11/608,678

(22) Filed: Dec. 8, 2006

(65) Prior Publication Data

US 2007/0150588 A1  Jun. 28, 2007

Related U.S. Application Data

(60) Provisional application No. 60/749,256, filed on Dec. 8, 2005.

(51) Int. Cl.
*G06F 15/16* (2006.01)

(52) U.S. Cl. ...... 709/225; 709/206; 709/224; 705/14.49

(58) Field of Classification Search ............... 709/203, 709/206–208, 224, 225, 231; 705/14, 26, 705/27; 707/10, 104.1; 283/56; 715/738, 715/742, 744–747
See application file for complete search history.

(56) References Cited

U.S. PATENT DOCUMENTS

| | | | |
|---|---|---|---|
| 6,594,692 B1 * | 7/2003 | Reisman | 709/219 |
| 6,654,735 B1 * | 11/2003 | Eichstaedt et al. | 1/1 |
| 6,684,195 B1 * | 1/2004 | Deaton et al. | 705/14 |
| 6,836,799 B1 * | 12/2004 | Philyaw et al. | 709/224 |
| 6,842,767 B1 * | 1/2005 | Partovi et al. | 709/203 |
| 6,868,525 B1 * | 3/2005 | Szabo | 715/738 |
| 6,901,378 B1 * | 5/2005 | Linker et al. | 705/27 |
| 6,915,271 B1 * | 7/2005 | Meyer et al. | 705/14 |
| 6,925,441 B1 * | 8/2005 | Jones et al. | 705/10 |
| 6,947,900 B2 * | 9/2005 | Giordano et al. | 705/26 |
| 6,961,723 B2 * | 11/2005 | Faybishenko et al. | 707/3 |
| 6,968,334 B2 * | 11/2005 | Salmenkaita et al. | 707/10 |
| 7,082,426 B2 * | 7/2006 | Musgrove et al. | 707/3 |
| 7,117,208 B2 * | 10/2006 | Tamayo et al. | 707/6 |
| 7,124,101 B1 * | 10/2006 | Mikurak | 705/35 |
| 7,130,820 B2 * | 10/2006 | Song | 705/26 |
| 7,181,438 B1 * | 2/2007 | Szabo | 707/2 |
| 7,240,025 B2 * | 7/2007 | Stone et al. | 705/26 |
| 7,249,059 B2 * | 7/2007 | Dean et al. | 705/26 |
| 7,277,870 B2 * | 10/2007 | Mourad et al. | 705/51 |
| 7,310,658 B2 * | 12/2007 | Giles et al. | 709/206 |
| 7,346,492 B2 * | 3/2008 | Shaw | 704/9 |

(Continued)

OTHER PUBLICATIONS

International Patent Application PCT/US06/61808, International Search Report and Written Opinion(mailed Jul. 29, 2008).

*Primary Examiner* — Lynn Feild
*Assistant Examiner* — Melvin H Pollack
(74) *Attorney, Agent, or Firm* — Greenberg Traurig, LLP (57) ABSTRACT

Apparatus and method for providing a marketing service are described. In one embodiment, a computer-readable storage medium includes: (1) a preferences module that is configured to collect a set of preferences of a user; (2) a monitoring module that is configured to monitor a web site based on the set of preferences so as to identify relevant content; and (3) a notification module that is configured to generate a message alerting the user of the relevant content.

22 Claims, 5 Drawing Sheets

U.S. PATENT DOCUMENTS

| | | | |
|---|---|---|---|
| 7,346,556 B2* | 3/2008 | Upendran et al. | 705/26 |
| 7,401,123 B2* | 7/2008 | Cama | 709/206 |
| 7,461,127 B2* | 12/2008 | Cama | 709/206 |
| 7,490,135 B2* | 2/2009 | Klug et al. | 709/217 |
| 7,497,369 B2* | 3/2009 | Dalzell et al. | 235/375 |
| 7,512,658 B2* | 3/2009 | Brown et al. | 709/206 |
| 2004/0044566 A1* | 3/2004 | Bostelmann et al. | 705/14 |
| 2004/0064361 A1* | 4/2004 | Anderson et al. | 705/14 |
| 2004/0083131 A1* | 4/2004 | Kaufman et al. | 705/14 |
| 2005/0010484 A1* | 1/2005 | Bohannon et al. | 705/26 |
| 2005/0044008 A1* | 2/2005 | Freishtat et al. | 705/26 |
| 2005/0049933 A1 | 3/2005 | Upendran et al. | |
| 2005/0060417 A1* | 3/2005 | Rose | 709/228 |
| 2005/0097003 A1* | 5/2005 | Linker | 705/26 |
| 2005/0097180 A1* | 5/2005 | Abdelhak | 709/208 |
| 2005/0102292 A1 | 5/2005 | Tamayo et al. | |
| 2005/0119939 A1* | 6/2005 | Henning et al. | 705/14 |
| 2005/0160014 A1* | 7/2005 | Moss et al. | 705/26 |
| 2005/0165656 A1* | 7/2005 | Frederick et al. | 705/26 |
| 2005/0222906 A1* | 10/2005 | Chen | 705/14 |
| 2006/0026067 A1* | 2/2006 | Nicholas et al. | 705/14 |
| 2006/0287934 A1* | 12/2006 | Rowe, III | 705/35 |

* cited by examiner

Inventory Alert

| Unavailable |
|---|

Men's Regular GORE-TEX Slicker
Size: L. Item # 9377AF4

Were sorry, this item is temporarily unavailable. You may be interested in a similar item or sign up for a back-in-stock reminder below:

☑ Notify me when back in stock online
☐ Notify me when back in stock in a store near zip: [ ]

```
[    1    ▽] [add to cart]
Item No. 79525
(?) alert me about wines like this ▽
```

Please alert me about new wines:

| vine type | region |
|---|---|
| Cabernet Sauvignon ▽ | Napa Valley, California ▽ |

| points | price |
|---|---|
| [0] to [100] | $ [0] to $ [25] |

⎫
⎬ 402
⎭ add search criteria to your alert listing (optional)
[                                              ]

enter a winery name, year, or even a tasting description
example: Fransiscan
example: "red berry" 2004

Send my wine.com alerts to:

⊙ ✉ [name@example.com]    Privacy Policy

Verify:  name@example.com

○  MY YAHOO! Home Page (What is this?)

○  MY MSN Home Page (What is this?)

○  [RSS]  Reader (What is this?)

⎫
⎬ 404
⎭

[Cancel]                [OK]

(rs) Powered by RubiconSoft

APPARATUS AND METHOD FOR PROVIDING A MARKETING SERVICE

CROSS-REFERENCE TO RELATED APPLICATION

This application claims the benefit of U.S. Provisional Application Ser. No. 60/749,256, filed on Dec. 8, 2005, the disclosure of which is incorporated herein by reference in its entirety.

BRIEF DESCRIPTION OF THE INVENTION

The invention relates generally to marketing. More particularly, the invention relates to an apparatus and method for providing a marketing service.

BACKGROUND OF THE INVENTION

The Internet is a large collection of computers operated using a client-server computer network model. In a client-server computer network, a client computer requests information from a server computer. In response, the server computer provides the requested information to the client computer. In some instances, the server computer can be operated as a web site, and can provide the requested information in the form of web pages. Server computers are often operated by large organizations, such as commercial organizations, governmental units, and educational organizations, while client computers are often operated by individuals.

With the increasing popularity of the Internet, merchants have set up web sites for selling products, which can include tangible products in the form of goods as well as intangible products in the form of services. By accessing these web sites, consumers can view information regarding various products, and can place purchase orders for particular products of interest. In an effort to enhance sales and promote customer satisfaction and loyalty, merchants operating web sites have implemented marketing campaigns to reach out to existing or potential customers. Unfortunately, the design and execution of traditional marking campaigns can be time-consuming, and can divert limited resources of the merchants from other productive tasks. Moreover, traditional marketing campaigns can be unsuccessful in achieving their goals, particularly when measured relative to the amount of time and other resources devoted to these marketing campaigns. While this lack of success results from a number of factors, the lack of personalization or tailoring of advertising material is sometimes a key factor. In particular, traditional marketing campaigns often involve sending standardized advertising material to a group of consumers, such as via mass Electronic-Mail ("E-Mail"). Unfortunately, different consumers can have widely varying preferences in terms of topics of interest, and, thus, many consumers receiving this standardized advertising material may not be interested in its contents.

It is against this background that a need arose to develop the apparatus and method described herein.

SUMMARY OF THE INVENTION

In one aspect, the invention relates to a computer-readable storage medium. In one embodiment, the computer-readable storage medium includes: (1) a preferences module that is configured to collect a set of preferences of a user; (2) a monitoring module that is configured to monitor a web site based on the set of preferences so as to identify relevant content; and (3) a notification module that is configured to generate a message alerting the user of the relevant content.

In another embodiment, the computer-readable storage medium includes executable instructions to: (1) identify a set of product preferences of a user; (2) collect product information related to a merchant; (3) analyze the product information so as to match the set of product preferences with a set of products offered by the merchant; and (4) alert the user of the set of products.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION

Figure 1:
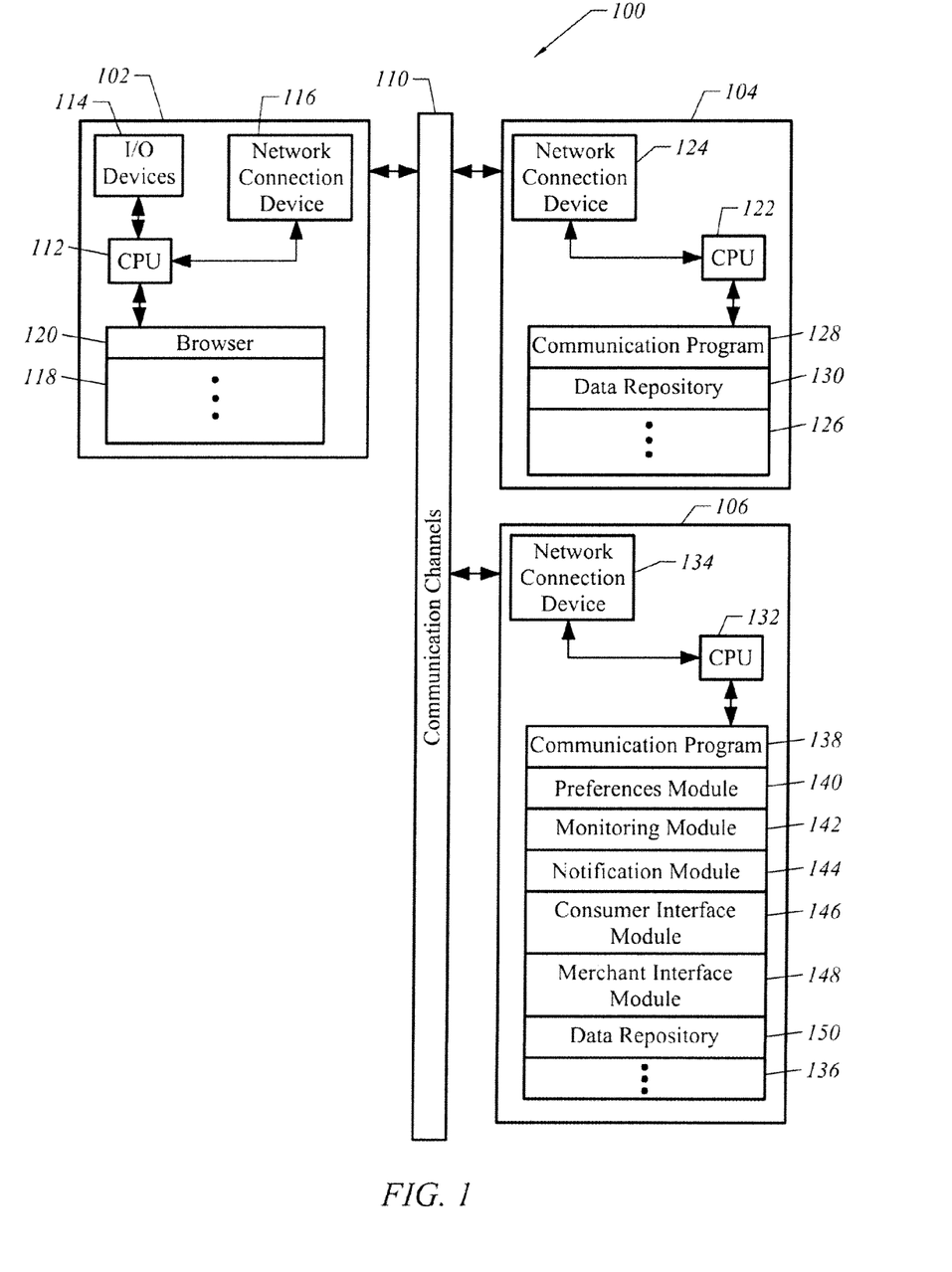
FIG. 1 illustrates a computer system that is implemented in accordance with an embodiment of the invention.

FIG. 1 illustrates a computer system 100 that is implemented in accordance with an embodiment of the invention. In the illustrated embodiment, the computer system 100 is a client-server computer network that includes at least one client computer 102 and multiple server computers, including server computers 104 and 106. The client computer 102 and the server computers 104 and 106 are connected by a set of one or more communication channels 110, which can include any wire or wireless communication channel. In the illustrated embodiment, the communication channels 110 allow transmission of information via any of a number of delivery options, such as Hypertext Transfer Protocol ("HTTP"), E-Mail, Instant Messaging ("IM"), Really Simple Syndication or Rich Site Summary ("RSS"), and Short Message Service ("SMS").

As illustrated in FIG. 1, the client computer 102 is operated by a user who wishes to obtain information regarding products, events, sales, or any other topics of interest. For example, the user may wish to obtain information regarding products having characteristics that match the user's individual preferences, and, based on such information the user may wish to purchase particular products of interest. The client computer 102 can be, for example, a desktop computer, a laptop computer, a palm-sized computer, a personal digital assistant, or a cellular telephone. As illustrated in FIG. 1, the client computer 102 includes conventional client computer components, including a Central Processing Unit ("CPU") 112 that is connected to a set of input/output devices 114, a network connection device 116, and a memory 118. The memory 118 stores a number of computer programs, including a browser 120. The browser 120 operates to establish conventional network communications with the server computers 104 and 106 via the network connection device 116. In addition, the browser 120 operates to visually present information received from the server computers 104 and 106. The browser 120 can be, for example, a web browser or a reader. While a single client computer 102 is illustrated in FIG. 1, it should be recognized that the operations described herein can be extended to multiple client computers operated by multiple users.

In the illustrated embodiment, the server computer 104 is operated by a merchant as a web site for selling products. As illustrated in FIG. 1, the server computer 104 includes conventional server computer components, including a CPU 122 that is connected to a network connection device 124 and a memory 126. The memory 126 stores a number of computer programs, including a communication program 128. The communication program 128 operates to establish conventional network communications with the client computer 102 and the server computer 106 via the network connection device 124. As illustrated in FIG. 1, the memory 126 also stores a data repository 130, which organizes information regarding products, events, sales, or any other topics related to activities of the merchant. At least some of this information is organized as web pages that form the web site.

As illustrated in FIG. 1, the server computer 106 is operated to facilitate the design and execution of marketing campaigns to reach out to existing or potential customers of the merchant. Similar to the server computer 104, the server computer 106 includes conventional server computer components, including a CPU 132 that is connected to a network connection device 134 and a memory 136. The memory 136 stores a number of computer programs, including a communication program 138. The communication program 138 operates to establish conventional network communications with the client computer 102 and the server computer 104 via the network connection device 134. In the illustrated embodiment, the memory 136 also stores a set of computer programs implementing the operations described herein. In particular, the memory 136 stores a preferences module 140, a monitoring module 142, a notification module 144, a consumer interface module 146, and a merchant interface module 148. The various modules 140, 142, 144, 146, and 148 operate in conjunction with a data repository 150, which organizes information related to the design and execution of marketing campaigns.

Advantageously, the various modules 140, 142, 144, 146, and 148 operate to provide an improved consumer marketing service that allows personalized or tailored advertising material to be sent to consumers. This personalization or tailoring of advertising material is accomplished through a higher level of insight into consumers' needs or wants. In particular, the consumer marketing service obtains this higher level of insight by identifying individual preferences of consumers, such as by collecting those individual preferences while the consumers are visiting the merchant's web site. Next, the consumer marketing service monitors information related to the merchant so as to identify relevant content that matches those individual preferences. Upon identifying relevant content that matches individual preferences of a particular consumer, the consumer marketing service alerts or notifies the consumer of the relevant content. In such manner, the consumer marketing service delivers highly relevant communication targeted at appropriate consumers, thereby resulting in enhanced sales as well as enhanced customer satisfaction and loyalty. Moreover, the consumer marketing service performs various operations on behalf of the merchant in an automated and integrated manner, thereby reducing the amount of time and other resources that the merchant has to devote to a marketing campaign.

As illustrated in FIG. 1, the preferences module 140 operates to collect a set of individual preferences of the user operating the client computer 102. Individual preferences can include those regarding products, events, sales, or any other topics of interest to the user. In addition, the individual preferences can include those regarding a desired message format, a desired delivery option, a desired message frequency, or any other characteristics of messages to be sent to the user. In such manner, the consumer marketing service can not only deliver relevant content but can also deliver such content via a desired communication medium. Collection of individual preferences can occur while the user is visiting the merchant's web site, and the individual preferences can be explicitly captured, inferred, or both. The individual preferences can be maintained in a preference profile that is stored in the data repository 150.

For example, the preferences module 140 can collect individual preferences of the user by providing a set of user interfaces to allow the user to specify those individual preferences. In particular, as the user is visiting the merchant's web site, the user can be allowed to sign-up for messages at different points. These points can be strategically placed along the web site, and can correspond to preference capture points at which the user can sign-up for or request messages for various topics of interest. By way of example, if the user is interested in purchasing a particular product that is currently out-of-stock, the user can be prompted to sign-up for a "Back-in-Stock" notification. Table 1 below provides other examples of sign-up options for topics in different categories.

TABLE 1

| CATEGORY | TOPIC |
| --- | --- |
| Product-related | New size/color/style available for a current product |
| Product-related | Usage tips |
| Product-related | Pre-arrival notification |
| Product-related | New arrivals in a particular product category |
| Product-related | Featured products in a particular product category |
| Product-related | Top-selling products in a particular product category |
| Product-related | Back-in-stock notification |
| Product-related | Complementary products/cross-sell/similar products |
| Product/sale/event-related | Online sale in a particular product category |
| Product/sale/event-related | Products in a user's wish-list that go on sale |
| Product/sale/event-related | Products in a user's gift-registry that go on sale |
| Product/sale/event-related | Products in a user's shopping cart that go on sale |
| Product/sale/event-related | Store sale in a particular product category |
| Sale/event-related | Pre-sale days in a store near a particular zip-code |
| Sale/event-related | General events in a particular neighborhood |
| Sale/event-related | Reminder to register for sweepstakes (e.g., daily, weekly, and so |

TABLE 1-continued

| CATEGORY | TOPIC |
|---|---|
| | forth) |
| Transaction-related | Notification when someone reviews a user's wish-list/gift-registry or buys a product specified in the wish-list/gift-registry |
| Transaction-related | Notification when someone adds a product to a wish-list/gift-registry |
| Transaction-related | A user's loyalty points are about to hit a next tier |
| Transaction-related | Online purchase (e.g., notification when products are ready for pickup at a local store) |
| Time-based reminders | Refill reminders |
| Time-based reminders | Reminder about a product in a particular number of days/weeks |
| Time-based reminders | Reminder about a shopping cart in a particular number of days/weeks |
| Time-based reminders | Reminder before a holiday (e.g., Mother's day) |
| Time-based reminders | Reminder on a particular date (e.g., before someone's birthday) |
| Search-related | Notification when products related to a previous null search result become available |
| Search-related | Saved search |

To allow faster and easier integration with the merchant's web site, an appropriate Hypertext Markup Language ("HTML") tag can be incorporated in a source web page that forms the web site. When the user clicks a navigation link or a button related to the HTML tag, the user can be navigated to a "sign-up" page or a "my-alerts" page, which can be provided by the preferences module 140 as a separate window. It is also contemplated that the "sign-up" page can be incorporated within the source web page, such as via iframe. By using appropriate HTML reference information, the preferences module 140 can identify the source web page as well as any other relevant information on the source web page for populating the "sign-up" page. In addition, the preferences module 140 can use a set of HTTP cookies to track the identity of the user for subsequent processing.

Alternatively, or in conjunction, the preferences module 140 can collect individual preferences of the user by monitoring browsing behavior of the user. In particular, as the user is visiting the merchant's web site, the preferences module 140 can monitor browsing behavior of the user so as to infer individual preferences in a seamless fashion and without requiring the user to explicitly specify those individual preferences. By way of example, the individual preferences can be inferred based on one or more of the following: (a) the user visits a product detail page multiple times or a particular number of times at or above a threshold; (b) the user visits a product category page multiple times or a particular number of times at or above a threshold; (c) the user adds a product to a shopping cart; and (d) the user completes an on-line purchase. Monitoring of browsing behavior can be performed using an appropriate Web beacon, such as a 1 by 1 pixel element sometimes referred to as a "dart," which is incorporated in one or more source web pages that form the merchant's web site. In some instances, a collaborative filtering technique can be used to infer individual preferences of the user based on browsing behavior or other activities of the user. To obviate any privacy concerns, monitoring of browsing behavior can be performed upon obtaining prior consent from the user.

As discussed above, the preferences module 140 can also collect individual preferences regarding characteristics of messages to be sent to the user. For example, the individual preferences can include one or more of the following: (a) a desired message format, such as a particular layout or design (e.g., related to a long-form message, a short-form message, a headline, or an individual product message), a particular level of detail, or a particular length (e.g. a restriction on the number of recommended products per message); (b) a desired delivery option, such as via E-Mail, IM, RSS, SMS, or a Web portal; and (c) a desired message frequency, such as a particular number of messages per day, a particular number of messages per week, a particular number of messages per month, any number of messages but restricted to particular days of a week, or any number of messages with no restrictions. Individual preferences regarding messages can be explicitly captured, such as via a "sign-up" page or a "my-alerts" page as discussed above. Alternatively, or in conjunction, the individual preferences can be inferred, such as by monitoring behavior of the user in response to previously sent messages. For example, the preferences module 140 can monitor a rate at which the user opens previously sent messages, such as by using an appropriate Web beacon that is incorporated in one or more of those messages. Next, the preferences module 140 can compare this rate with respect to an average or typical rate to infer whether characteristics of those messages are desirable.

Subsequent to collection of individual preferences of the user, the preferences module 140 can provide a set of options to allow the user to modify those individual preferences or to specify additional individual preferences. In addition, the preferences module 140 can provide a set of options to allow the user to opt out of receiving further messages. These options can be provided at different points, such as in a "sign-up" page or a "my-alerts" page, in a confirmation or welcome message after sign-up, in any subsequent message regarding a recommended product, or in a Web portal.

Still referring to FIG. 1, the monitoring module 142 operates to collect information regarding products, events, sales, or any other topics related to activities of the merchant. Collection of information can be performed based on a particular time schedule, such as on a periodic or non-periodic basis, and can be performed by monitoring the merchant's web site. For example, the monitoring module 142 can crawl the web site using an appropriate Web crawler so as to collect information from the web site. Alternatively, or in conjunction, the monitoring module 142 can collect information via a data feed from the server computer 104 or from another data source.

Once information has been collected, the monitoring module 142 operates to analyze the information based on individual preferences of the user so as to identify relevant content that matches those individual preferences. This relevant content can include a set of images, text, or other content derived from the merchant's web site or from a data feed. For example, if the user has expressed interest in purchasing a particular product that was previously out-of-stock, the monitoring module 142 can analyze information related to the merchant so as to identify relevant content regarding whether or when the product will be back-in-stock. If the product does not become available within a particular time period, the monitoring module 142 can identify relevant content regarding an alternative or similar set of products. These alternative products can be selected by the merchant or can be dynamically selected by the monitoring module 142 based on a set of configurable rules.

In some instances, the monitoring module 142 can analyze information related to the merchant so as to identify a set of recommended products for the user. The recommended products can be tracked in a pool of recommendations that is stored in the data repository 150. To reduce storage requirements and to enhance processing efficiency, the monitoring module 142 can efficiently manage the pool of recommendations, such as by selecting additions to the pool of recommendations as well as controlling a size of the pool of recommendations. For example, the pool of recommendations can correspond to a reduced product catalog that is generated based on individual preferences of the user. The monitoring module 142 can implement a collaborative filtering technique to generate an initial set of results, and the monitoring module 142 can then refine or re-prioritize those results based on individual preferences of the user so as to manage the pool of recommendations. Also, the monitoring module 142 can update the pool of recommendations as individual preferences of the user are modified or as additional individual preferences are collected. In addition, the monitoring module 142 can update the pool of recommendations as particular recommendations expire or become stale. Various recommendations can expire or become stale based on different timing criteria. For example, a recommendation regarding a product that is on sale can expire after one particular time period, such as after one week, while a recommendation regarding a new product can expire after another time period, such as after one month.

As illustrated in FIG. 1, the notification module 144 operates to alert or notify the user of relevant content that has been identified by the monitoring module 142. For example, if the user has expressed interest in purchasing a particular product that was previously out-of-stock, the notification module 144 can alert the user of relevant content regarding whether or when the product will be back-in-stock. If the product does not become available within a particular time period, the notification module 144 can alert the user of relevant content regarding an alternative or similar set of products.

Alerting the user can be performed by generating a set of messages and transmitting the messages to the user. For example, the notification module 144 can dynamically generate a message by incorporating relevant content into a message template. This message template can be selected by the merchant or can be dynamically selected by the notification module 144 based on a set of configurable rules. In addition, the notification module 144 can incorporate a navigation link into the message, such that, when the user clicks on the navigation link, the user can be navigated to the merchant's web site.

Generation and transmission of messages can be performed based on individual preferences of the user regarding characteristics of those messages, such as a desired message format, a desired delivery option, and a desired message frequency. Alternatively, or in conjunction, generation and transmission of the messages can be performed based on a set of configurable rules, which can be used to specify default values regarding characteristics of those messages. The notification module 144 can dynamically adjust characteristics of messages as individual preferences of the user are modified, as additional individual preferences are collected, or as default values are modified. For example, as discussed previously, the preferences module 140 can monitor a rate at which the user opens previously sent messages, and can compare this rate with respect to an average or typical rate. If the user opens the previously sent messages at a lower rate than the average rate, the notification module 144 can throttle back a frequency at which subsequent messages are sent to the user. This throttling back can be performed in a series of incremental stages until a desired message frequency is obtained. Alternatively, or in conjunction, the notification module 144 can dynamically change either of, or both, a message format and a delivery option for subsequent messages that are sent to the user.

In some instances the notification module 144 can determine that the user is eligible to receive multiple messages, and the notification module 144 can generate and transmit all of the messages or a selected subset Of the messages. Selection of which particular subset of the messages to be sent can be performed based on individual preferences of the user. Alternatively, or in conjunction, selection of a particular subset of the messages can be performed based on a set of configurable rules, which can be used to specify a set of priorities or rankings in accordance with the merchant's promotional activities and goals, the merchant's profit margins, the merchant's inventory, and other factors. For example, the user may have expressed a preference to receive a "New Arrivals" notification for jeans as well as a preference to receive a "Back-In-Stock" notification for athletic shoes. If the desired jeans and the desired athletic shoes become available during the same week, the notification module 144 can determine whether to alert the user regarding the jeans, the athletic shoes, or both. If the user has expressed a preference to receive all relevant content, the notification module 144 can send one message alerting the user regarding the jeans and another message alerting the user regarding the athletic shoes. However, if the user has expressed a preference to receive no more than one message per week, the notification module 144 can send a single message alerting the user regarding the athletic shoes.

In other instances, the notification module 144 can determine that there are multiple recommendations in the user's pool of recommendations, and the notification module 144 can alert the user regarding all of the recommendations or a selected subset of the recommendations. Selection of which particular subset of the recommendations can be performed based on individual preferences of the user. Alternatively, or in conjunction, selection of a particular subset of the recommendations can be performed based on a set of configurable rules. The configurable rules can be used to specify a set of priorities or rankings based on one or more of the following: (a) a higher priority for products similarly priced as those previously purchased; (b) a higher priority for products that are on sale if previous behavior of the user indicates price sensitivity; (c) a higher priority for new products if previous behavior of the user indicates a preference for new arrivals; and (d) a higher priority for cross-selling products if indicated by previous behavior of the user. The notification module 144 can select the number of recommendations per message based on individual preferences of the user, based on a set of configurable rules, or both.

Alerting the user can also be performed substantially in real-time such as while the user is visiting the merchant's web site. For examples the notification module 144 can present a set of recommendations in a separate window or within a source web page that forms the web site. These recommendations can be presented to the user at strategically placed points along the web site, such as: (a) after or during check-out; (b) after or while adding a product to a shopping cart; (c) when the user visits a product detail page multiple times or a particular number of times at or above a threshold; and (d) when the user visits a product category page multiple times or a particular number of times at or above a threshold.

As illustrated in FIG. 1, the consumer interface module 146 operates to provide a consumer Web portal, which presents relevant content that is personalized or tailored for the user. For example, by accessing the consumer Web portal, the user can view a pool of recommendations, previous messages sent to the user, as well as individual preferences of the user. The consumer Web portal can also provide a set of controls for particular features of the consumer marketing service. For example, the consumer Web portal can provide a set of options to allow the user to modify individual preferences or to specify additional individual preferences. As another example, the consumer Web portal can provide a set of options to mark particular recommendations as undesirable or already purchased. In response to marking of particular recommendations, the user's pool of recommendations can be adjusted so as to simply include recommendations of interest to the user.

Still referring to FIG. 1, the merchant interface module 148 operates to provide a merchant Web portal, which provides a set of controls for particular features of the consumer marketing service. By way of example, the merchant Web portal can allow the merchant to specify preference capture characteristics using a wizard-based interface. In particular, the merchant can specify a particular preference capture methodology, such as one based on multi-category check-off or a single click "sign-up" option. Next, the merchant can specify characteristics related to the specified preference capture methodology. For example, if the merchant has selected a single click "sign-up" option, the merchant can be prompted to specify product characteristics and default values to be used when the user clicks a "sign-up" button. In the case of a product such as wine, the merchant can specify product characteristics such as region, price, wine type, and rating. For each product characteristic, the merchant can be prompted to specify a set of values for collecting the user's individual preferences. For a product characteristic with hierarchical values, the merchant Web portal can allow specification of a current value in a hierarchy as well as a set of additional values higher up in the hierarchy. For example, in the case of wine type, the merchant can specify "red" and "Cabernet Sauvignon." For a product characteristic with numerical values, the merchant Web portal can allow specification of a range of numerical values. For example, in the case of price, the merchant can specify a range of $20 to $30 or a range of −30% to +25% relative to some reference value.

As another example, the merchant Web portal can allow the merchant to specify characteristics of messages using a "What-You-See-Is-What-You-Get" or "WYSIWYG" methodology, which can be based on a set of message templates and a set of configurable rules. In particular, using a wizard-based interface, the merchant can perform one or more of the following: (a) select a particular message template from a library of message templates; (b) specify a particular message format, such as a particular layout or design with particular logos, headers, footers, and colors; and (c) generate or modify a set of configurable rules related to placement or selection of relevant content to be incorporated into a message template.

In addition, the merchant Web portal can present a set of reports regarding performance or other characteristics of a marketing campaign. For example, by accessing the merchant Web portal, the merchant can view reports regarding key performance indicators, trends with respect to consumer behavior or usage, and segmentation analysis.

The foregoing provides an overview of an embodiment of the invention. Attention next turns to FIG. 2, which illustrates an operational scenario 200 according to an embodiment of the invention.

Figure 2:
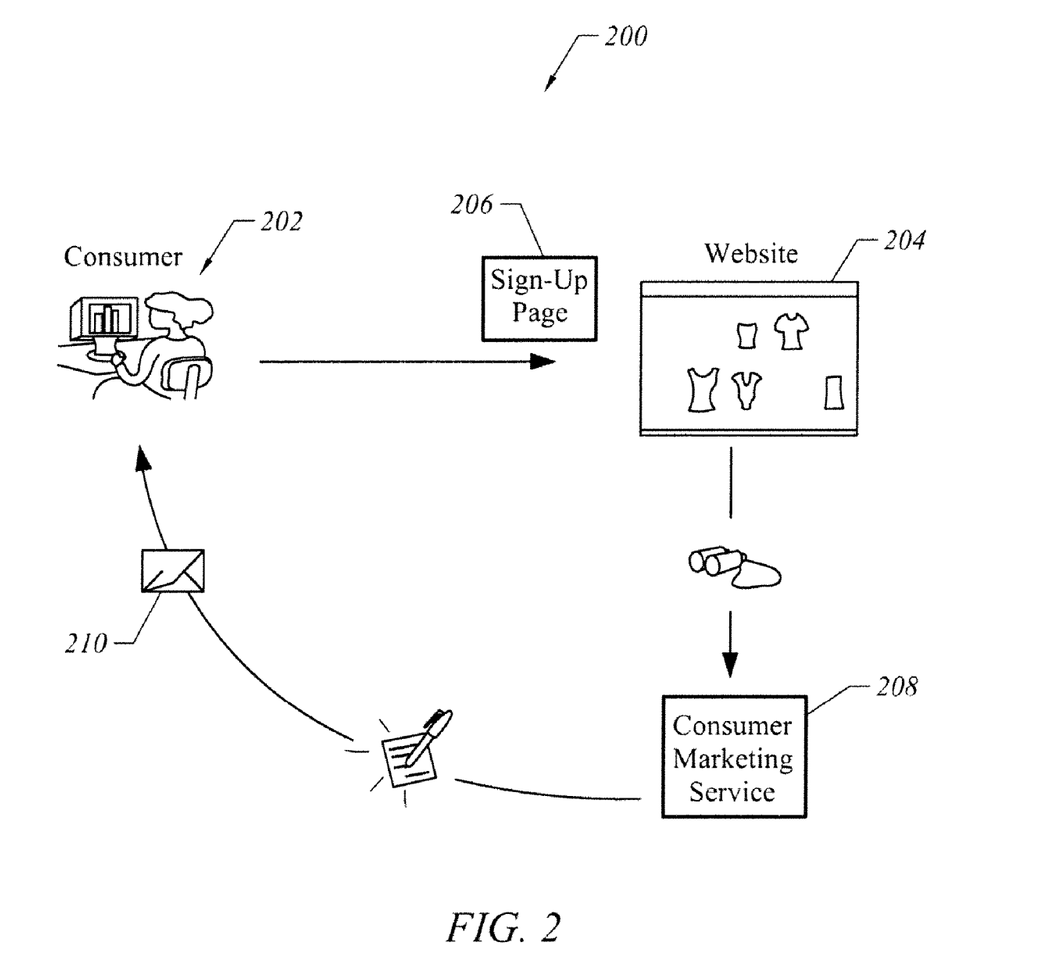
FIG. 2 illustrates an operational scenario according to an embodiment of the invention.
Figure 3:
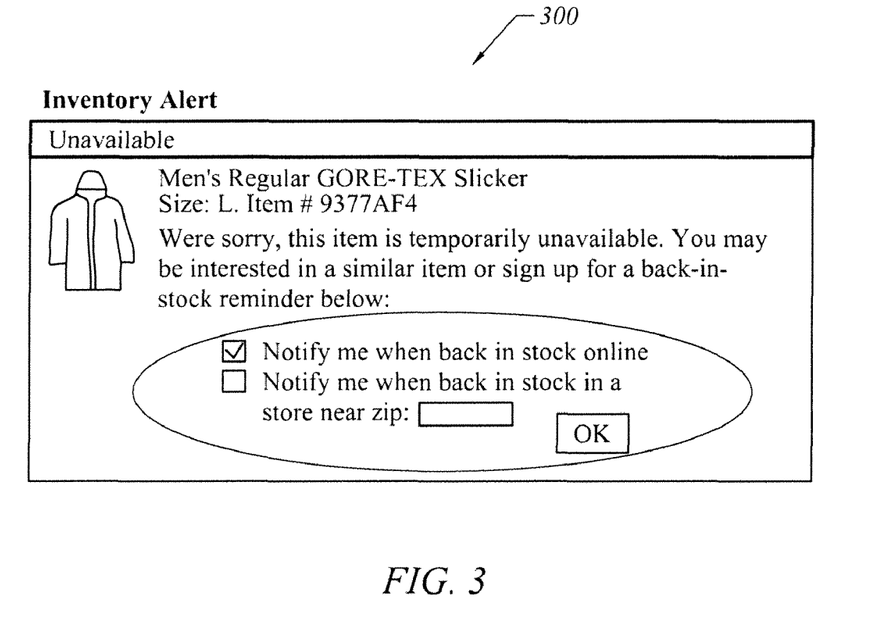
FIGS. 3 and 4 illustrate examples of user interface screens that can be provided in accordance with an embodiment of the invention.

Referring to FIG. 2, as a consumer 202 is visiting a merchant's web site 204, the consumer 202 is allowed to specify individual preferences at different points along the web site 204. By way of example, the web site 204 can be set up for selling apparel, and the consumer 202 may be interested in purchasing a coat of a particular size or color. If that size or color is currently out-of-stock, the consumer 202 can be prompted to sign-up for a "Back-in-Stock" notification using a "sign-up" page 206. The "sign-up" page 206 is provided by a consumer marketing service 208, but is integrated with the web site 204 so as to appear seamless from the standpoint of the consumer 202. FIG. 3 illustrates an example of a user interface screen 300 to sign-up for a "Back-in-Stock" notification.

Figure 4:
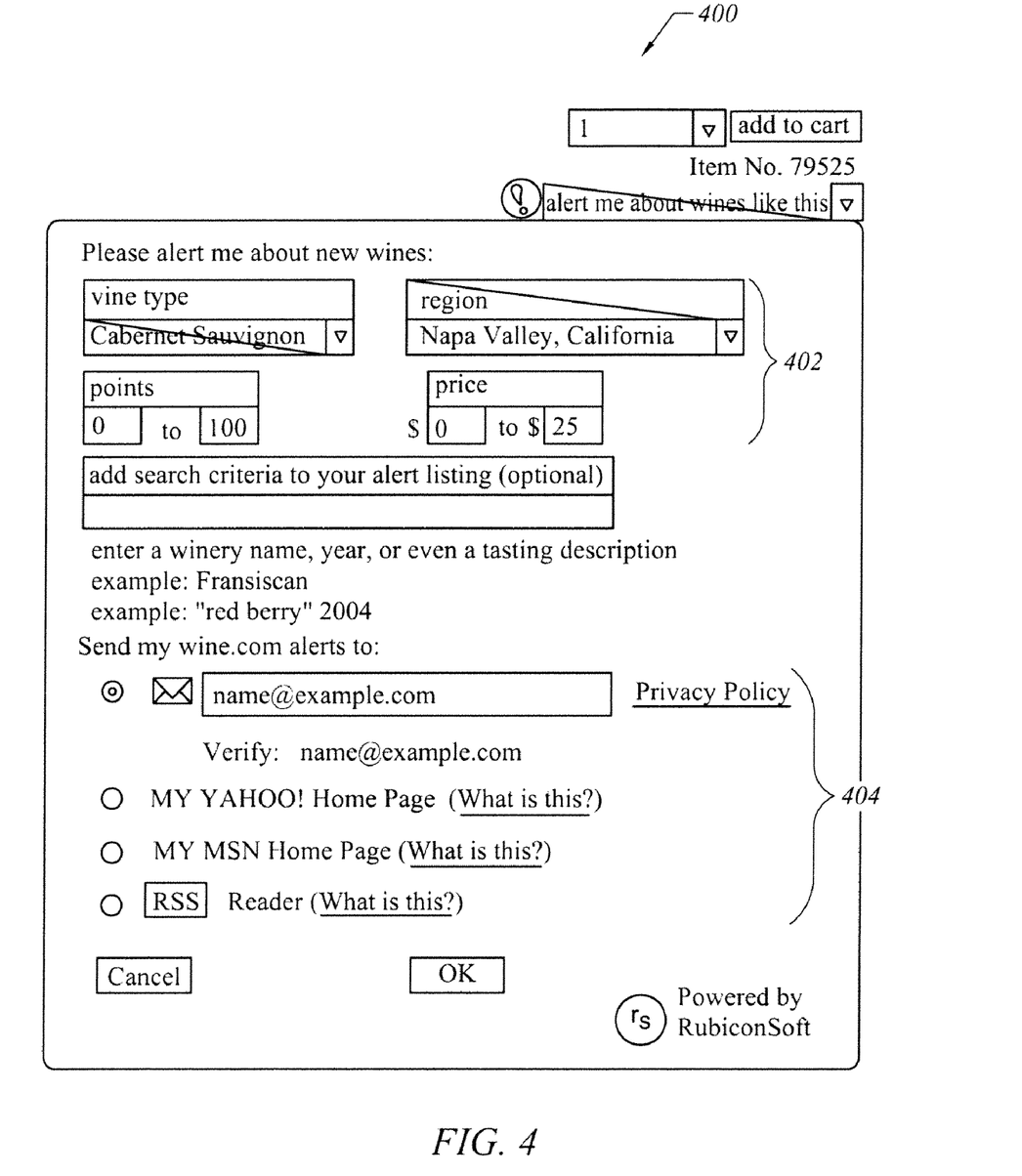

As another example, the web site 204 can be set up for selling wines, and the consumer 202 may be interested in new wines of a particular type. In this case, the consumer 202 can be prompted to sign-up for a "New Arrivals" notification using the "sign-up" page 206. Again, the "sign-up" page 206 is provided by the consumer marketing service 208, but is integrated with the web site 204 so as to appear seamless from the standpoint of the consumer 202. FIG. 4 illustrates an example of a user interface screen 400 to sign-up for a "New Arrivals" notification. As illustrated in FIG. 4, the user interface screen 400 includes a set of options 402 to specify a wine type, a region, a range of ratings, and a range of prices. In addition, the user interface screen 400 includes a set of options 404 to specify a desired delivery option for a "New Arrivals" notification.

Referring back to FIG. 2, the consumer marketing service 208 next monitors the web site 204 based on the individual preferences specified by the consumer 202 so as to identify relevant content. Upon identifying relevant content that matches those individual preferences, the consumer marketing service 208 generates a personalized message 210 alerting the consumer 202 of the relevant content.

By way of example, if the consumer 202 has signed-up for a "Back-in-Stock" notification for a coat of a particular size or color, the consumer marketing service 208 can monitor the web site 204 on a periodic basis to determine whether or when that size or color becomes available. Once that size or color becomes available, the consumer marketing service 208 can generate the message 210 alerting the consumer 202. When the consumer 202 clicks a navigation link incorporated into the message 210, the consumer 202 is navigated to the web site 210 so as to complete an on-line purchase.

As another example, if the consumer 202 has signed-up for a "New Arrivals" notification for new wines of a particular type, the consumer marketing service 208 can monitor the web site 204 on a periodic basis to determine whether or when those new wines become available. Once those new wines become available, the consumer marketing service 208 can generate the message 210 alerting the consumer 202. Again, when the consumer 202 clicks a navigation link incorporated into the message 210, the consumer 202 is navigated to the web site 210 so as to complete an on-line purchase.

Figure 5:
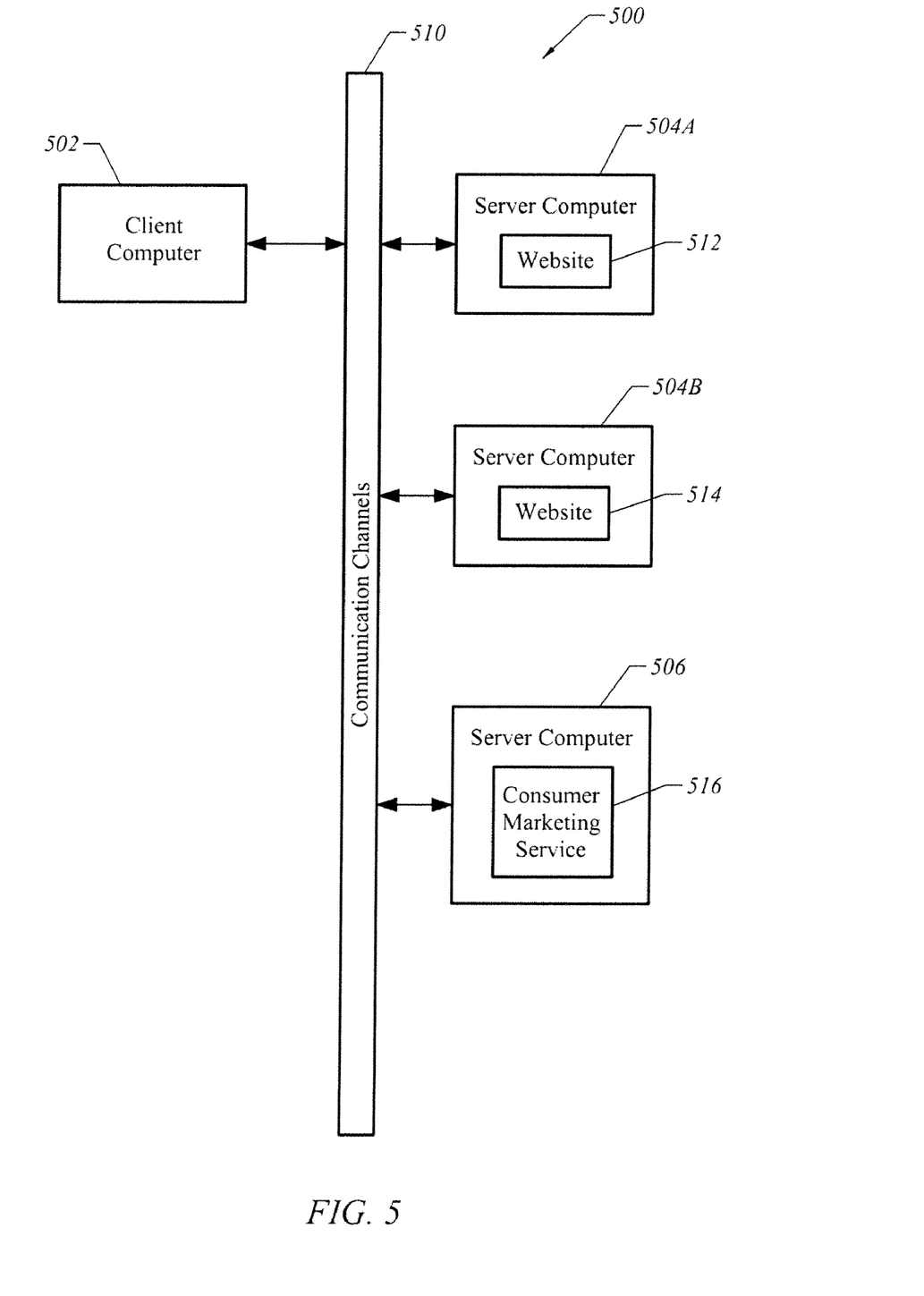
FIG. 5 illustrates a computer system that is implemented in accordance with another embodiment of the invention.

FIG. 5 illustrates a computer system 500 that is implemented in accordance with another embodiment of the invention. In the illustrated embodiment, the computer system 500 is a client-server computer network that includes at least one client computer 502 and multiple server computers, including server computers 504A, 504B, and 506, The client computer 502 and the server computers 504A, 504B, and 506 are connected by a set of communication channels 510, which can include any wire or Wireless communication channel. Certain features of the computer system 500 are implemented in a similar fashion as previously discussed in connection with FIG. 1 and, thus, are not further described herein.

As illustrated in FIG. 5, the client computer 502 is operated by a user who wishes to obtain information regarding products, events, sales, or any other topics of interest. The server computer 504A is operated by a first merchant as a web site 512 for selling a first set of products, while the server computer 504B is operated by a second merchant as a web site 514 for selling a second set of products. In the illustrated embodiment, the first merchant and the second merchant are members of a group of cooperating merchants who wish to cooperate in reaching out to existing or potential customers. For example, the first merchant and the second merchant can sell complementary, cross-selling, alternative, or similar products, and the first merchant and the second merchant may wish to cooperate in a joint marketing campaign with respect to those products.

As illustrated in FIG. 5, the server computer 506 is operated as a consumer marketing service 516 to facilitate the design and execution of the joint marketing campaign. Advantageously, the consumer marketing service 516 facilitates generation of marketing opportunities for the first merchant and the second merchant through a higher level of insight into consumers' needs or wants. In particular, the consumer marketing service 516 obtains this higher level of insight by identifying individual preferences of consumers, such as by collecting those individual preferences while the consumers are visiting either of, or both, the web site 512 and the web site 514. Moreover, the consumer marketing service 516 performs various operations on behalf of the first merchant and the second merchant in an automated and integrated manner, thereby reducing the amount of time and other resources that the first merchant and the second merchant have to devote to the joint marketing campaign.

For example, while visiting the web site 512, the user operating the client computer 502 may express interest in purchasing a particular product from the first merchant. If that product is currently out-of-stock, the user can be prompted to sign-up for a "Back-in-Stock" notification. If that product does not become available within a particular time period, the consumer marketing service 516 can monitor the web site 514, and can alert the user regarding an alternative or similar set of products from the second merchant. These alternative products can be selected by the first merchant and the second merchant or can be dynamically selected by the consumer marketing service 516 based on a set of configurable rules. As another example, if the user has expressed interest in purchasing a particular product from the first merchant, the consumer marketing service 516 can perform segmentation analysis to determine that the user may also be interested in purchasing a complementary or cross-selling set of products from the second merchant. These complementary products can be selected by the first merchant and the second merchant or can be dynamically selected by the consumer marketing service 516 based on a set of configurable rules. It is contemplated that the consumer marketing service 516 can use a permission-based marketing methodology when generating such marketing opportunities for the first merchant and the second merchant.

As another example, the consumer marketing service 516 can analyze information related to the first merchant and the second merchant so as to identify a set of recommended products. The consumer marketing service 516 can track the recommended products in a pool of recommendations, which can be presented to the user via a consumer Web portal. In addition, the consumer marketing service 516 can alert the user about one or more of the recommended products substantially in real-time. For example, while the user is visiting the web site 512 operated by the first merchant, the consumer marketing service 516 can alert the user about a set of recommended products from the second merchant.

Advantageously, the consumer marketing service 516 can also generate marketing opportunities for a group of merchants without requiring cooperation between members of the group of merchants. In particular, the consumer marketing service 516 can obtain a higher level of insight into consumers' needs or wants, and can apply this higher level of insight to generate marketing opportunities for the first merchant and the second merchant, without requiring their cooperation in a joint marketing campaign.

It should be recognized that the embodiments of the invention described above are provided by way of example, and various other embodiments are contemplated. For example, it is contemplated that a consumer marketing service can implement a number of variations for a user interface that collects individual preferences. The variations can include differences in format, differences in content, or both. The consumer marketing service can present the variations to a number of consumers, and can track the effectiveness of each of the variations. The effectiveness can be tracked using one or more of the following metrics: (a) a sign-up visit rate, such as a percentage of a total number of web site visitors who visit a "sign-up" page; (b) a sign-up rate, such as a percentage of a total number of visitors of a "sign-up" page who actually sign-up; and (c) a sign-up update rate, such as a percentage of a total number of signed-up visitors who later revisit a "sign-up" page. In such manner, the consumer marketing service can implement a feedback loop so as to identify and select a variation that is most effective across various consumers. It is also contemplated that the consumer marketing service can identify and select a variation that is most effective for each consumer. In particular, the consumer marketing service can maintain a preference profile for each consumer, and can reference the preference profile so as to generate a user interface that is personalized or tailored for each consumer and that is consistent across multiple visits.

As another example, it is contemplated that a consumer marketing service can implement a number of variations for messages that are sent to consumers. The variations can include, for example, differences in message format. The consumer marketing service can present the variations to a number of consumers, and can track the effectiveness of each of the variations. In such manner, the consumer marketing service can implement a feedback loop so as to identify and select a variation that is most effective across various consumers. It is also contemplated that the consumer marketing service can identify and select a variation that is most effective for each consumer. In particular, the consumer marketing service can maintain a preference profile for each consumer, and can reference the preference profile so as to use a message format that is personalized or tailored for each consumer and that is consistent across multiple messages sent to that consumer.

As a further example, while some embodiments have been described with reference to a consumer marketing service, it should be recognized that the features discussed herein can also be applied to other types of marketing services. In particular, these other types of marketing services can deliver highly relevant communication targeted at different points along a supply chain, such as affiliates, dealers, and suppliers.

An embodiment of the invention relates to a computer storage product with a computer-readable medium having executable instructions or computer code thereon for performing various computer-implemented operations. The term "computer-readable medium" is used herein to include any medium that is capable of storing or encoding a sequence of executable instructions or computer code for performing the operations described herein. The media and computer code can be those specially designed and constructed for the purposes of the invention, or can be of the kind well known and available to those having ordinary skill in the computer software arts Examples of computer-readable media include computer-readable storage media such as: magnetic media such as hard disks, floppy disks, and magnetic tape; optical media such as Compact Disc-Read Only Memories ("CD-ROMs") and holographic devices; magneto-optical media such as floptical disks; and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files containing higher level code that are executed by a computer using an interpreter. For example, an embodiment of the invention may be implemented using Java, C++, or other programming language and development tools. Additional examples of computer code include encrypted code and compressed code. Another embodiment of the invention can be implemented in hardwired circuitry in place of, or in combination with, computer code.

Another embodiment of the invention can be downloaded as a computer program product, which can be transferred from a remote computer (e.g., a server computer) to a requesting computer (e.g., a client computer or a different server computer) to a requesting computer (e.g., a client computer or a different server computer).

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly unless specifically indicated herein, the order and grouping of the operations is not a limitation of the invention.

What is claimed is:

1. A tangible computer-readable storage medium having stored thereon a set of instructions executable by a computing device comprising:

a preferences module configured to collect a set of preferences of a user, the preferences module monitoring the rate at which messages specifically directed to and personalized for the user are opened by the user to selectively adjust a desired message frequency rate at which the messages are sent to the user, each of the messages having a beacon, wherein the messages relate to products desired by the user;

a monitoring module configured to monitor a web site based on the set of preferences so as to identify relevant content of the website relating to the products desired by the user, the relevant content of the website to be provided to the user; and a notification module configured to generate a message alerting the user of the relevant content;

wherein the set of preferences includes a message format selected by the user, and the notification module is configured to generate the message based on the desired message format, the desired message format being one of a plurality of formats, selectable by the user, each of the plurality of formats having a unique content layout and length.

2. The computer-readable storage medium of claim 1, wherein the preferences module is configured to collect the set of preferences by providing a user interface that allows the user to sign up for a notification including at least one of a first indication that a first product is back in stock and a second indication that a second product has newly arrived.

3. The computer-readable storage medium of claim 1, wherein the preferences module is configured to collect the set of preferences by monitoring browsing behavior of the user while visiting the web site.

4. The computer-readable storage medium of claim 1, wherein the relevant content concerns a second product when a time period elapses, the second product an alternate to a first product.

5. The computer-readable storage medium of claim 1, wherein the set of preferences includes a set of product preferences, and the monitoring module is configured to monitor the web site based on the set of product preferences so as to identify a set of recommended products.

6. The computer-readable storage medium of claim 1, wherein the monitoring module is configured to monitor the web site by crawling the web site so as to identify the relevant content.

7. The computer-readable storage medium of claim 1, wherein the notification module is configured to generate the message by incorporating the relevant content into a message template.

8. The computer-readable storage medium of claim 1, wherein the notification module is configured to generate the message by incorporating a navigation link to the web site.

9. The computer-readable storage medium of claim 1, wherein the set of preferences includes a delivery option desired by the user, and the notification module is configured to transmit the message to the user based on the desired delivery option.

10. A computer implemented method comprising:

identifying, using a computing device, a set of product preferences of a user, the identifying including monitoring the rate at which messages specifically directed to and personalized for the user are opened by the user to selectively adjust a desired message frequency rate at which the messages are sent to the user, each of the messages having a beacon, wherein the messages relate to products desired by the user;

collecting product information related to a merchant;

monitoring a website based on the set of product preferences to identify relevant content of the website relating to the products desired by the user, the relevant content of the website to be provided to the user;

analyzing the product information so as to match the set of product preferences with a set of products offered by the merchant;

alerting the user of the set of products; and generating a message based on a desired message format selected by the user, wherein the set of preferences includes the desired message format, the desired message format being one of a plurality of formats, selectable by the user, each of the plurality of formats having a unique content layout and length.

11. The method of claim 10, wherein the identifying includes collecting the set of product preferences while the user is visiting a web site operated by the merchant.

12. The method of claim 11, wherein the collecting the set of product preferences includes monitoring browsing behavior of the user while visiting the web site.

13. The method of claim 11, wherein the collecting the product information includes crawling the web site.

14. The method of claim 10, wherein the collecting the product information includes collecting the product information from the merchant via a data feed.

15. The method of claim 10, wherein the alerting the user includes generating a set of messages alerting the user of the set of products.

16. The method of claim 15, further comprising identifying a set of message preferences of the user, and wherein the generating the set of messages include generating the set of messages based on the set of message preferences.

17. The method of claim 16, wherein the set of message preferences includes a desired message frequency, and the alerting the user further includes transmitting the set of messages to the user at the desired message frequency.

18. The method of claim 10, wherein the alerting the user includes delivering a communication alerting the user of the set of products.

19. The method of claim 10, further comprising tracking the set of products in a pool of recommendations.

20. The method of claim 19, further comprising managing the pool of recommendations by controlling a size of the pool or recommendations based on the set of product preferences.

21. The method of claim 10, wherein the merchant is a first merchant, and further comprising:

collecting product information related to a second merchant;

analyzing the product information related to the second merchant so as to match the set of product preferences with a set of products offered by the second merchant; and alerting the user of the set of products offered by the second merchant.

22. The method of claim 21, wherein the first merchant and the second merchant define a group of cooperating merchants.

* * * * *